(12) United States Patent
Sharaphi

(10) Patent No.: US 8,292,049 B2
(45) Date of Patent: Oct. 23, 2012

(54) VEHICULAR BRAKE AND METHOD THERFOR

(76) Inventor: Avshalom Eden Sharaphi, Ramat-Gan (IL)

( * ) Notice: Subject to any disclaimer, the term of this patent is extended or adjusted under 35 U.S.C. 154(b) by 328 days.

(21) Appl. No.: 12/726,371

(22) Filed: Mar. 18, 2010

(65) Prior Publication Data

US 2011/0227404 A1    Sep. 22, 2011

(51) Int. Cl.
*F16D 57/02* (2006.01)
(52) U.S. Cl. ......................... 188/293; 188/294
(58) Field of Classification Search .................. 188/290, 188/293, 294, 296; 303/10
See application file for complete search history.

(56) References Cited

U.S. PATENT DOCUMENTS

| | | | | |
|---|---|---|---|---|
| 1,501,444 A * | 7/1924 | English et al. | ................ | 188/293 |
| 1,548,460 A * | 8/1925 | Harrigan | ....................... | 188/294 |
| 1,584,223 A * | 5/1926 | Horspool et al. | ............. | 188/293 |
| 1,611,112 A * | 12/1926 | Gates | ............................. | 188/293 |
| 1,631,800 A * | 6/1927 | Dotsch | ........................ | 188/271 |
| 1,896,103 A * | 2/1933 | Shantz | ........................ | 188/293 |
| 1,945,606 A * | 2/1934 | Gudgeon et al. | ............. | 188/271 |
| 1,992,848 A * | 2/1935 | Wade | ............................ | 188/293 |
| 2,055,775 A * | 9/1936 | Rogers | ........................ | 188/293 |
| 2,208,074 A * | 7/1940 | Holz | ............................. | 188/293 |
| 2,358,825 A * | 9/1944 | Pribula | ........................ | 188/293 |
| 2,513,879 A * | 7/1950 | Kennedy | ...................... | 188/293 |
| 2,807,335 A * | 9/1957 | Beaumont et al. | ............ | 188/293 |

* cited by examiner

*Primary Examiner* — Robert A Siconolfi
*Assistant Examiner* — Mariano Sy
(74) *Attorney, Agent, or Firm* — AlphaPatent Associates Ltd.; Daniel J. Swirsky

(57) ABSTRACT

In one aspect, the present invention is directed to a vehicular brake (10) comprising: a closed-circuit tunnel (14, 62) containing hydraulic liquid (72); a mechanism (22) for moving the hydraulic liquid (72) within the closed-circuit tunnel (14, 62) together with the wheel (30) of the vehicle; and at least one faucet (24) within the closed-circuit tunnel (14, 62), for reducing the cross-section area (from A1 to A2) of the closed-circuit tunnel (14, 62) at least at one location, upon braking activity, thereby braking the vehicle wheel (30) without friction wear.

4 Claims, 3 Drawing Sheets

VEHICULAR BRAKE AND METHOD THERFOR

FIELD OF THE INVENTION

The present invention relates to the field of vehicles. More particularly, the invention relates to a vehicular brake.

BACKGROUND OF THE INVENTION

The prior art vehicular brakes include a brake rotor which spins together with the vehicle wheel, and a brake caliper which squeezes the rotor. Braking is friction-based.

Thus, the brakes require periodic maintenance due to friction wear.

The method described above has not provided a satisfactory solution to the problem of friction wear to the brakes, requiring periodic maintenance.

It is an object of the present invention to provide a vehicular brake that operates without friction wear.

It is another object of the present invention to provide a solution to the above-mentioned and other problems of the prior art.

Other objects and advantages of the invention will become apparent as the description proceeds.

SUMMARY OF THE INVENTION

In one aspect, the present invention is directed to a vehicular brake (10) comprising:
  a closed-circuit tunnel (14, 62) containing hydraulic liquid (72);
  a mechanism (22) for moving the hydraulic liquid (72) within the closed-circuit tunnel (14, 62) together with the vehicle wheel (30); and
  at least one faucet (24) within the closed-circuit tunnel (14, 62), for reducing the cross-section area (from A1 to A2) of the closed-circuit tunnel (14, 62) at least at one location, upon braking activity,
thereby braking the vehicle wheel (30) without friction wear.

The mechanism (22) for moving the hydraulic liquid (72) together with the wheel (30) of the vehicle may comprise vanes (22) within the contained hydraulic liquid (72), for circulating the hydraulic liquid (72) and for being rotated by the hydraulic liquid (72); vanes (22) may be connected to the vehicle wheel (30) so as to rotate together.

The closed-circuit tunnel (14, 62) may comprise:
  an initial tunnel (14), in which motion of the vanes (22) performs the circulation of the hydraulic liquid (72); and
  a bypass (62) between the ends (68) of the initial tunnel (14), in which the faucet (24) performs the reduction of the circulation,
thereby the faucet (24) does not disturb the rotation of vanes (22) within closed-circuit tunnel (14, 62).

The initial tunnel (14) may comprise a tunnel between:
  an external envelope (56) of a disk (12) rotating with the vanes (22); and
  an annular internal envelope (58) of the stationary package (54) of the vehicular brake (10),
wherein the center of the disk (12) is shifted from the center of the annular internal envelope (58).

The vanes (22) may be adapted to substantially touch the annular internal envelope (58) of the stationary package (54), thereby improving circulation of the hydraulic liquid (72) within the closed-circuit tunnel (14, 62) upon rotation of the vehicle wheel (30).

The adaptation of the vanes (22) to substantially touch the annular internal envelope (58) of the stationary package (54), may comprise:
  a piston (22) slideable within a cylinder (60) comprising each of the vanes (22); and
  a stationary leading track (18), for leading the piston (12) to substantially touch the annular internal envelope (58) of the stationary package (54).

The reduction of the cross-section area (from A1 to A2) of the closed-circuit tunnel (14, 62) by the faucet (24) may be adjustable, thereby the level of braking may be adjustable.

In another aspect, the present invention is directed to a method for braking a vehicle, the method comprising the steps of:
  rotating vanes (22) together with the vehicle wheel (30), for circulating hydraulic liquid (72) within a closed-circuit tunnel (14, 62); and
  closing at least one faucet (24), for reducing the hydraulic liquid circulation, to brake the vanes (22) together with the vehicle wheel (30),
thereby braking the vehicle wheel (30) without friction wear.

The closing of the faucet (24) may be adjustable, thereby reduction of hydraulic liquid circulation may be adjustable.

The reference numbers have been used to point on elements in the embodiments described and illustrated herein, in order to facilitate understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF THE INVENTION

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
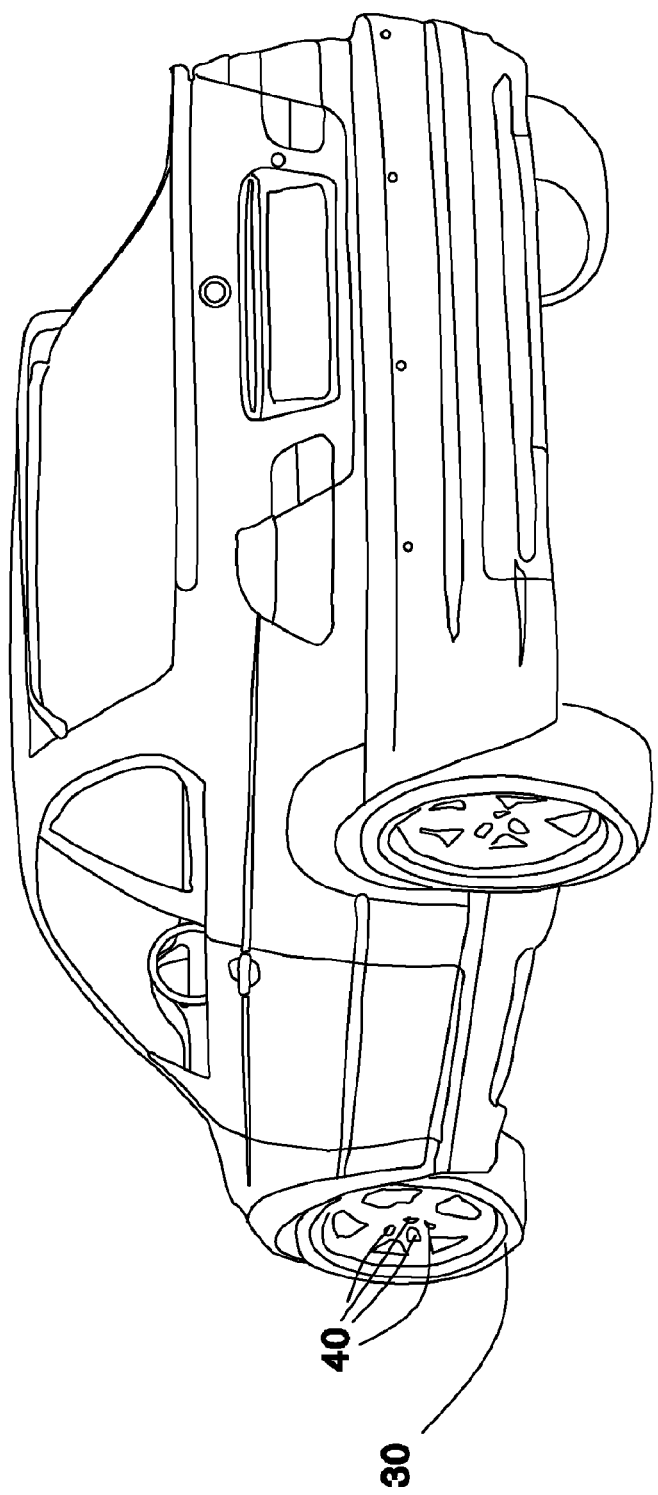
FIG. 1 depicts the wheel to be braked by the prior art vehicular brake and by the vehicular brake of the present invention.

FIG. 1 depicts the wheel to be braked by the prior art vehicular brake and by the vehicular brake of the present invention.

A wheel 30 of a vehicle is screwed by screws to studs 40 of a wheel carrier 52 (hidden) thereof.

Figure 2:
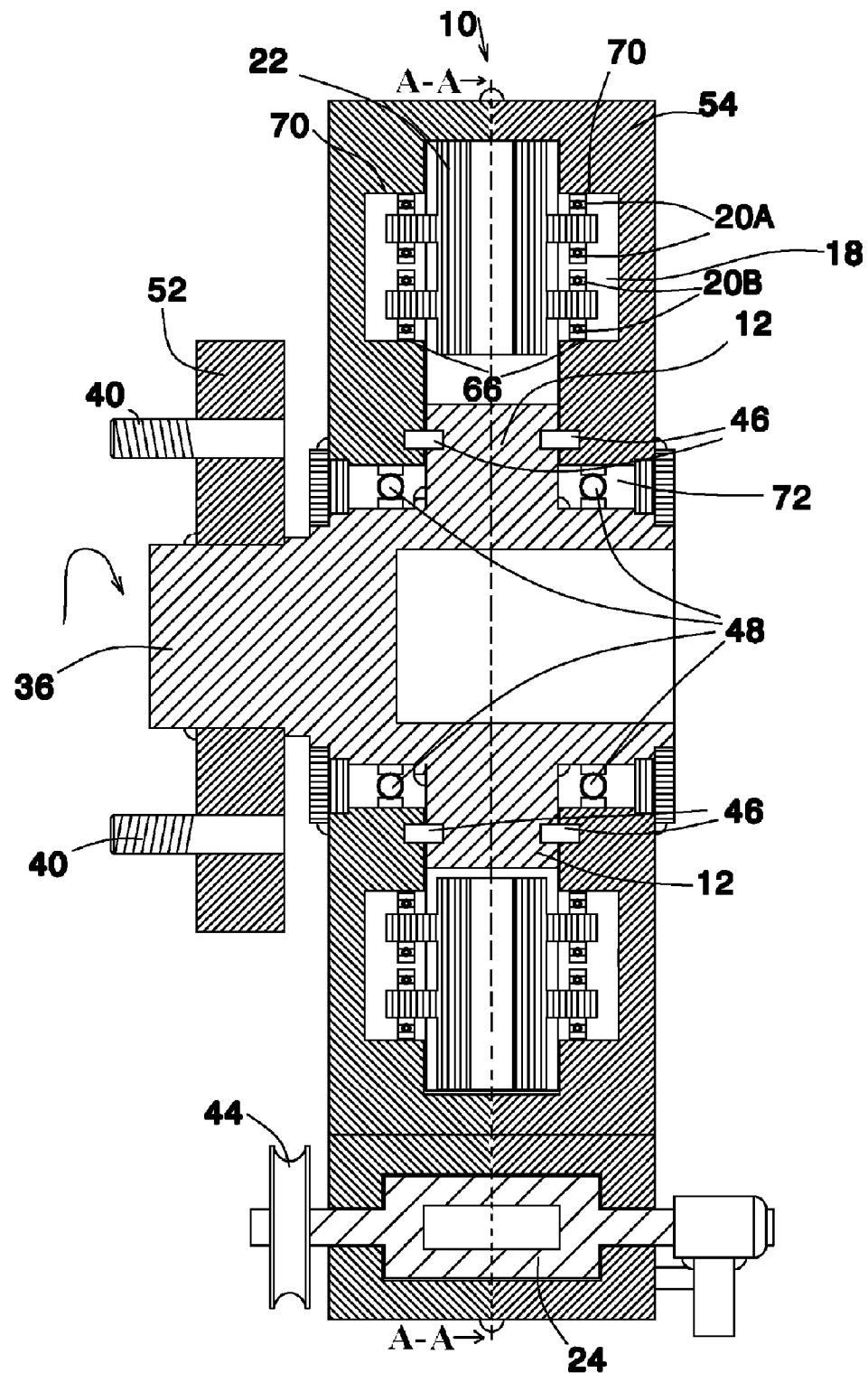
FIG. 2 is a side sectional view of a braking system according to one embodiment of the present invention.

FIG. 2 is a side sectional view of a braking system according to one embodiment of the present invention.

Wheel 30, held by studs 40 to wheel carrier 52, spins together with axle 36.

A vehicular brake 10 of the present invention brakes wheel carrier 52 by reducing or even totally blocking the flow of hydraulic liquid 72 therewithin. This hydraulic braking is intended to replace the prior art brake caliper twisting a disk.

Wheel carrier 52 spins together with a disk 12, through wheel bearings 48, about the stationary package 54 of vehicular brake 10. Seals 46 confine lubricant 72 of wheel bearings 48.

Braking the rotation of wheel carrier 52 is performed by rotating a sheave 44 to close a faucet 24, for blocking the flow of hydraulic liquid 72 within vehicular brake 10.

Figure 3:
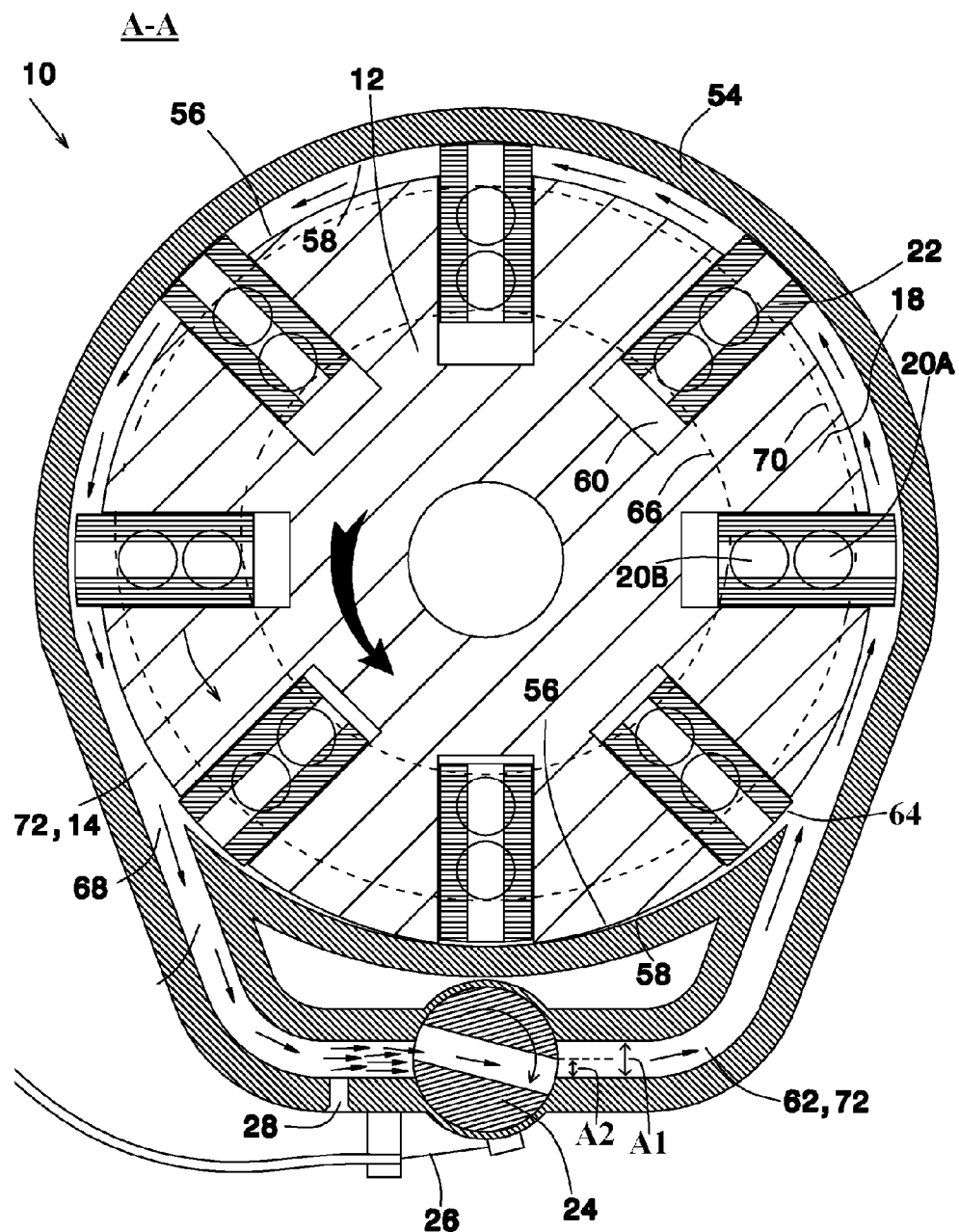
FIG. 3 is a front view of the hydraulic pump of the braking system of FIG. 2.

FIG. 3 is a front view of the hydraulic pump of the braking system of FIG. 2.

A significant part of the external envelope 56 of disk 12 is annular. Stationary package 54 includes an annular round internal envelope 58.

The center of disk 12 is shifted from the center of annular internal envelope 58 of package 54, providing eccentric rotation of disk 12 about annular internal envelope 58 of stationary package 54. This eccentric disposition forms an initial tunnel 14 containing hydraulic liquid 72 between external envelope 56 of rotating disk 12 and internal envelope 58 of stationary package 54.

The terms "top" and "bottom" refer herein to the locations as drawn in the sheets of FIGS. 2 and 3 only.

However, initial tunnel 14 is present at the "top" and "sides" of FIGS. 2 and 3 and is absent at the "bottom" of FIGS. 2 and 3, due to this eccentric disposition.

Disk 12 includes and is connected to vanes 22, thus disk 12 and vanes 22 move together. Motion of vanes 22 within initial tunnel 14 moves hydraulic liquid 72 therethrough.

Vanes 22 are formed as slideable pistons 22 within cylinders 60. The external sides 64 of pistons 22 are adapted to always touch internal envelope 58 of package 54, blocking pistons 22 when hydraulic liquid 72 does not flow, i.e., when braking is activated.

Pistons 12 rotating together with vehicle wheel 30 and disk 12 together press hydraulic liquid 72 to flow within initial tunnel 14. However, the hydraulic liquid 72 cannot flow at the portion where initial tunnel 14 is absent, which is at the bottom of FIG. 3 between external envelope 56 of disk 12 and internal envelope 58 of package 54.

Instead, the hydraulic liquid 72 flows from initial tunnel 14 and returns thereto through a bypass 62.

The term "closed-circuit tunnel" refers herein to initial tunnel 14 together with bypass 62.

Thus, rotation of vehicle wheel 30 circulates hydraulic liquid 72 within a closed-circuit tunnel including initial tunnel 14 and bypass 62, within wheel brake 10.

Appropriate hydraulic liquid 72 is to be selected for reducing friction of the hydraulic liquid flow.

In order to bring external sides 64 of pistons 22 towards internal envelope 58 of package 54, and in order that external sides 64 of pistons 22 will not enter inlet 68 of bypass 62, a stationary track 18 delimits and leads pistons 22 between internal wall 66 and an external wall 70 thereof.

Stationary track 18 and initial tunnel 14 are inherent elements of stationary package 54. External wall 70 of track 18 delimits external bearings 20A of piston 22, and internal wall 66 of track 18 delimits internal bearings 20B of piston 22.

Faucet 24 may reduce the cross-section area of bypass 62 from area A1 to area A2 or other. The level of the braking may be adjusted by the level of closing faucet 24.

Hydraulic liquid 72 may be added through an inlet 28.

In the figures and/or description herein, the following reference numerals have been mentioned:

numeral 10 denotes a vehicle brake, according to one embodiment of the present invention;
numeral 12 denotes a disk within the brake, which spins together with the vehicle wheel;
numeral 14 denotes a tunnel in which hydraulic liquid is moved by the pistons;
numeral 18 denotes a stationary track for leading the pistons;
numerals 20A and 20B denote bearings in the pistons for being led by the stationary track;
numeral 22 denotes a vane for moving hydraulic liquid; according to a preferred embodiment this vane is a piston;
numeral 24 denotes a faucet for blocking the flow of the hydraulic liquid; numeral 26 denotes a cable for closing and opening the faucet;
numeral 28 denotes a inlet for adding hydraulic liquid to the vehicular brake;
numeral 30 denotes the wheel of the vehicle to be braked;
numeral 36 denotes an axle of the wheel; according to the depicted example, the axle spins together with the wheel;
numeral 40 denotes a stud for connecting the wheel to the vehicle;
numeral 44 denotes a sheave for opening or closing the faucet of the hydraulic liquid;
numeral 46 denotes a seal for confining lubricant of the wheel bearings;
numeral 48 denotes a wheel bearing, which allows the wheel to spin about the stationary elements of the vehicle;
numeral 52 denotes a wheel carrier;
numeral 54 denotes the package of the vehicular brake, and it is stationary;
numeral 56 denotes the perimeter, which is the external envelope of the rotating disk;
numeral 58 denotes the internal envelope of the stationary package; this envelope is round, and includes an inlet and an outlet of the bypass;
numeral 60 denotes a cylinder in which a piston may slide outward or inward the rotating disk;
numeral 62 denotes a bypass for the hydraulic liquid continuing the initial tunnel;
numeral 64 denotes the external side of the piston, i.e., the side close to the perimeter of the disk which spins together with the vehicular wheel;
numeral 66 denotes an internal wall of the leading track;
numeral 68 denotes the inlet of the bypass; the leading track avoids entrance of the pistons thereinto;
numeral 70 denotes the external wall of the leading track; and
numeral 72 denotes hydraulic liquid.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

What is claimed is:

1. A vehicular brake comprising:
a closed-circuit tunnel containing hydraulic liquid;
a mechanism for moving said hydraulic liquid within said closed-circuit tunnel, together with a wheel of
a vehicle; and at least one faucet within said closed-circuit tunnel, for reducing a cross-section area of said closed-circuit tunnel at least at one location, upon braking activity, wherein said mechanism comprises at least one vane disposed within said contained hydraulic liquid, for circulating said hydraulic liquid and for being rotated by said hydraulic liquid, said at least one vane being connected to said vehicle wheel; and wherein said closed-circuit tunnel comprises: an initial tunnel, in which motion of said at least one vane performs said circulation of said hydraulic liquid; and a bypass between the ends of said initial tunnel, in which said at least one faucet performs said reduction of said circulation, wherein said initial tunnel comprises a tunnel between: an external envelope of a disk rotating with said at least one vane; and an annular internal envelope of a stationary package of said vehicular brake, wherein the center of said disk is shifted from the center of said annular internal envelope, and wherein said at least one vane is adapted to substantially touch said annular internal envelope of said stationary package, and wherein said adaptation of said at least one vane to substantially touch said annular internal envelope of said stationary package, comprises: a piston slideable within a cylinder comprising each of said at least one vane; and a stationary leading track, for leading said piston to substantially touch said annular internal envelope of said stationary package, thereby braking said vehicle wheel without friction wear.

2. A vehicular brake according to claim 1, wherein said reduction of said cross-section area of said closed-circuit tunnel by said faucet is adjustable, thereby the level of said braking is adjustable.

3. A method for braking a vehicle, said method comprising the steps of:
rotating at least one vane together with a wheel of said vehicle, for circulating hydraulic liquid disposed within a closed-circuit tunnel by leading said at least one vane within a stationary leading track; and
closing at least one faucet, for reducing said hydraulic liquid circulation, to brake said at least one vane together with said vehicle wheel,
thereby braking said vehicle wheel without friction wear.

4. A method according to claim 3, wherein said closing of said faucet is adjustable, thereby said reduction of said hydraulic liquid circulation is adjustable.

* * * * *